United States Patent Office 3,539,756
Patented Nov. 10, 1970

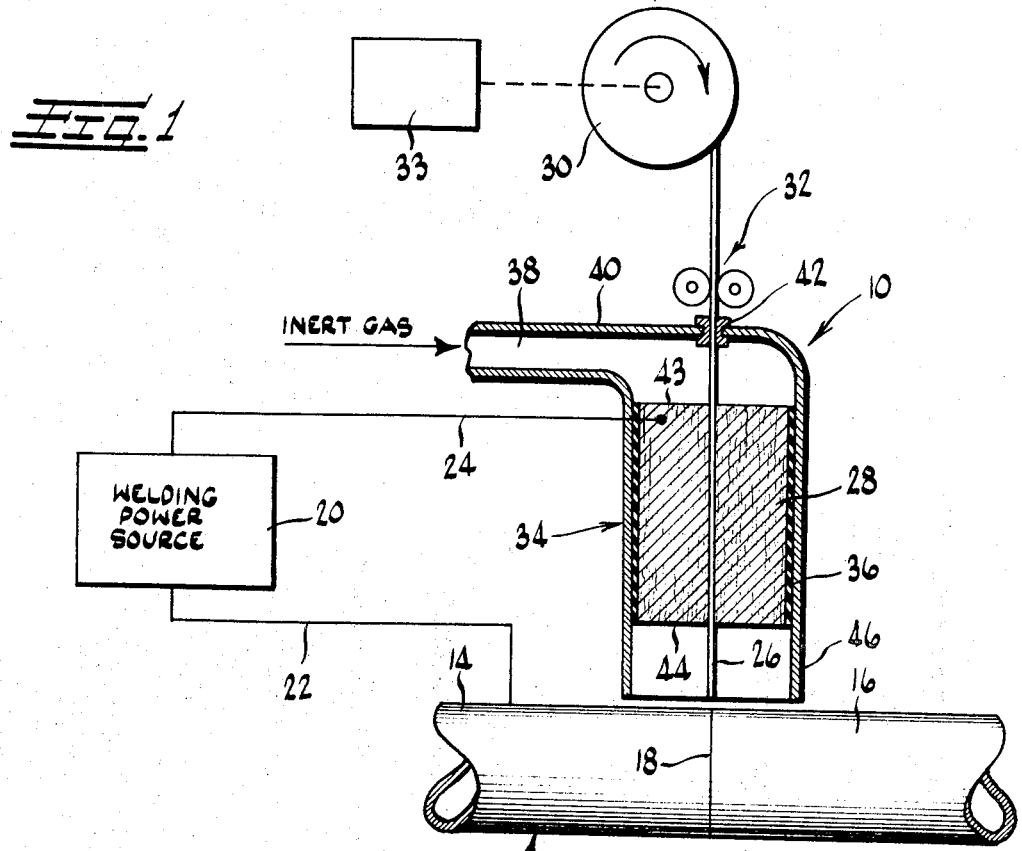
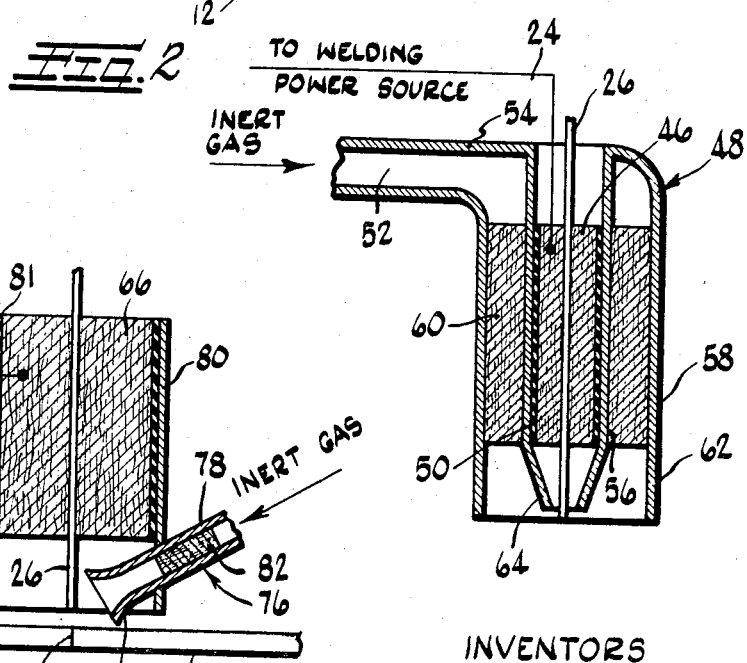

3,539,756
WELDING APPARATUS
Harry Schwartzbart, Evergreen Park, and Zalman P. Saperstein, Glenwood, Ill., and John F. Rudy, Littleton, Colo., assignors to IIT Research Institute, Chicago, Ill., a not-for-profit corporation of Illinois
Filed Aug. 30, 1967, Ser. No. 664,318
Int. Cl. B65d 9/02
U.S. Cl. 219—74
21 Claims

ABSTRACT OF THE DISCLOSURE

At least one fiber metallurgical body may be used for transferring electric current to a welding electrode. This or another fiber metallurgical body may function as a getter for removing contaminants from an inert shielding gas used in inert gas arc welding.

---

The present invention relates generally to electric arc welding apparatus, and particularly to such apparatus for inert gas arc welding.

Apparatus for inert gas arc welding conventionally comprises a welding torch having a welding electrode and a cylindrical contact tube concentrically disposed about the welding electrode for conducting the welding current thereto, and an annular passage or annulus about the electrode and contact tube for conducting the inert shielding gas to the welding area. The welding electrode may comprise a non-consumable tungsten electrode, or a consumable metal wire electrode, as is well known.

The shielding gas consists essentially of an inert monatomic gas, commonly being a gas such as argon or helium, which is used to shield the molten weld puddle from oxidation by forming a shroud thereabout. The gas is preferably supplied at the weld puddle as a substantially non-turbulent or laminar flow-stream of sufficient "stiffness" to exclude substantially all the ambient atmosphere from the arc. The inert shielding gas should be completely free of contaminants, such as moisture, hydrocarbons, or air, since hydrogen, oxygen, nitrogen or carbon from the contaminants can have deleterious effects on the properties and performance of the welds produced. The electric welding arc thus involves an electrical discharge through a controlled gas atmosphere, the gas in the arc gap being ionized and the resulting positive gas ions being impelled by the potential gradient toward the cathode where they yield their energy and are neutralized by electrons emitted therefrom. Metal vapor formed in the arc region by vaporization of the electrode, the workpiece, or some other source, forms part of the gas in the arc gap so that the arc atmosphere through which the electrical discharge takes place, and through which the weld metal transfers from the wire electrode to the workpiece, comprises the inert shielding gas and the metal vapor. Substantially all air, water vapor and other constituents of the ambient atmosphere are excluded by the inert gas shield. Thus, the characteristics of the weld depend in large part on the purity or lack of contamination of the gas, itself.

Another important factor affecting the weld is the characteristic of the electric arc. In the case of metallic inert gas welding, using a consumable metal wire electrode which is fed toward the weld through the contact tube, as well as in the case of tungsten inert gas welding, unsatisfactory current transfer between the contact tube and the welding electrode has heretofore been commonly experienced due to oxidation of the surface of the contact tube adjacent the welding electrode. The gradual deterioration or degradation of the current transfer characteristics of the contact tube is aggravated by arcing within the contact tube. This is especially so in the case of metallic inert gas welding, where the point of contact between the moving electrode wire and the stationary tube shifts substantially about within the contact tube. This degradation of the contact tube causes the arc behavior to become erratic, which has a deleterious effect on the completed weld, making it necessary to frequently replace the tube. This problem is discussed in detail in a paper entitled "Study of Current Contact Tubes for Gas Metal-Arc Welding," by Rudy, Brown, and Groth, published in the Welding Journal, August 1966, pages 376–S through 378–S.

It is a general object of the present invention to provide welding apparatus having an improved current transfer characteristic from the terminal of a welding torch to the welding electrode.

It is another object of the present invention to provide gettering of the inert shielding gas by novel means producing a gas shield or shroud which is free of contaminants.

It is a further object of the present invention to provide welding apparatus having improved current transfer characteristics and gettering of the shielding gas produced by a single element or assembly within the welding torch.

These and other objects of the invention are more particularly set forth in the following detailed description, and in the accompanying drawings, of which:

FIG. 1 is a schematic and simplified diagram of a welding torch constructed in accordance with the present invention;

FIGS. 2 and 3 illustrate modified forms or embodiments also constructed in accordance with the invention.

Referring now to FIG. 1, there is generally shown a welding torch 10 disposed in operating or welding relation to a workpiece 12, shown, for example, as being formed by two metal cylindrical members 14 and 16 being welding together at the seam 18, and a source of electric current 20, which may be of any conventional type, connecting the workpiece to the welding torch by means of leads, schematically illustrated as 22 and 24.

The welding torch 10 comprises the welding electrode 26, which is in electrical and mechanical or physical contact with a conductive contact member 28, which in turn, is electrically connected to the power source 20 by any suitable terminal means 24. The welding electrode 26, which in the illustrated embodiment is a consumable metallic wire, is fed to the torch 10 by any suitable means including a reel 30 which pays the wire through guide rollers 32, and through the contact member 28. Electrode 26 should maintain good contact with contact member 28. For this reason an interference fit is employed between the electrode and the contact member. The wire electrode 26 passes from the contact tube 28, where the welding current is introduced, directed to the arc, where the wire is melted or consumed by transfer to the weld puddle or crater on the workpiece 12.

Driving means 33, of any suitable and known type, rotates the reel 30 for moving the welding electrode 26 relative to the contact tube 28 to provide the feeding action of the electrode toward the weld puddle.

In accordance with one aspect of the invention, the contact tube 28 comprises a body composed of a fiber metallurgical composition having a substantially porous structure, i.e., as contrasted with powder metallurgy bodies on the one hand and conventional metal solids on the other. Such a porous fiber metallurgical body may be prepared from metallic fibers which are felted, consolidated and preferably, but not necessarily, sintered in various sequences and by various methods. These bodies can be described as a series of infinite trusses, or a series of tiny springs giving to the whole a high degree of conformability to the wire passing therethrough. Materials having these properties, and the methods for their manufacture, are disclosed in U.S Pat. No. 3,127,668 to W. C. Troy, assigned to the assignee of the present invention.

A cylindrical housing member or tube 34 is concentrically disposed about the fiber metallurgy contact tube 28, and is electrically insulated therefrom by a layer of insulation 36 disposed between the outer surface of the contact tube 28 and the inner surface of the cylindrical tube 34. A gas-tight sealing engagement is made between these members for reasons which will now be described.

Means for conducting the inert shielding gas to the area of the weld is provided, and is shown as including a gas entrance port 38 defined by an inlet tube 40 joined to the upper portion of the cylindrical housing member 34 so that the port 38 is in communication with the interior thereof. An aperture 42 is provided in the upper or roof portion of the housing, having suitable means for providing a gas-tight seal to the welding electrode to prevent the shielding gas from escaping. The inert gas entering through the port 38 under pressure passes through the upper annular face 43 of the porous fiber metallurgy contact tube 28. A gettering action on the gas which extracts the contaminants therefrom occurs during this passage by reaction with or dissolution of the contaminants by the metal. The fiber metal body is an efficient getter for a gas passing therethrough because of the high surface-to-mass ratio which is characteristic of this type of material.

The gettered inert gas, after passing through the contact tube 28 and exiting from the lower annular face 44, passes through a cylindrical nozzle portion 46, which in the illustrated embodiment of FIG. 1 is formed by the lower part of the cylindrical housing 34. The nozzle 46 provides a non-turbulent or laminar flow of gas over the welding area, as previously discussed.

Various metals are suitable for use in the fiber metallurgical bodies in accordance with the present invention. The specific metal or metals employed depend on the desired application. Some metals such as copper, molybdenum and stainless steel are especially good for the contact function. Other metals possess better properties for the gettering function. Examples of gettering metals are titanium, zirconium and tantalum. For a particular application, the most desirable fiber metallurgical body for performing both contact and gettering may be composed of a mixture of two or more types of fibers. The porous fiber metallurgical bodies are preferably sintered or otherwise formed so that the strands are bonded to each other at various points for providing good electrical continuity and to reduce the electrical resistance of the body, and consequent power loss, when performing an electrical transfer or contact function.

The use of a fiber metal contact tube in accordance with the invention, provides full and complete physical and electrical contact over the entire surface between the fiber metal body and the welding electrode because of the excellent conformability of the fiber metal body. Consequently, a minimum of arching and electrical transients are produced, resulting in longer useful contact tube life than heretofore possible, and an improved weld due to the substantial elimination of erratic arcing. This is achieved without any sacrifice in life due to wear, since the fiber metal body is tough and long-wearing against the frictional movement of the wire passing therethrough.

Another aspect of the present invention is that the gettering action of the fiber metal tube is substantially increased, i.e., its efficiency as a getter is readily optimized, when it is heated; and accordingly, the fiber metal contact tube is heated by the passage of the welding current therethrough which, in the embodiment of FIG. 1 inherently takes place due to the dual function of the contact tube. Hence, in such a construction, there is a significant interaction between the operation of the contact tube as an electrical transfer means or contact and its operation as a getter acting on the inert shielding gas, the resistive heating caused by the passage of all or part of the welding current through the contact tube causing the enhancement of the latter operation. In addition, the fiber metal contact tube is disposed sufficiently close to the welding area so that the radiant heat therefrom also enhances the gettering action.

An alternative embodiment of a welding apparatus constructed in accordance with the principles of the invention is schematically shown in FIG. 2. In this embodiment, a welding electrode 26 may be provided in the same manner as illustrated in the embodiment of FIG. 1. The welding electrode 26 passes centrally through a fiber metal contact tube 46 which is electrically connected by suitable terminal means 24 to a source of electrical power. The fiber metal contact tube 46 is disposed concentric to the electrode 26 within the aperture of an annular housing 48, and a layer of insulation 50 is disposed between the outer surface of the contact tube 46 and the inner aperture surface of the housing 48. The housing 48 defines a passage for the inert shielding gas which enters through port 52 formed by the inlet tube 54 joined to the top portion of the housing 48. The cylindrical inner and outer walls 56 and 58, respectively, of the housing 48, define an annular passage coaxial to the electrode 26 and the contact tube 46. Disposed within this annulus is a second fiber metallurgical body 60, similar to that used for the contact tube 46, being of the same or of a different metal composition. Thus, in this embodiment, the fiber metal body 46 performs only the current contact function, while the fiber body 60 performs only the shielding gas gettering function. The shielding gas shroud is provided over the weld puddle by the flow of gas through the nozzle defined by the lower portion 62 of the outer cylindrical wall 58 and the inwardly tapered conical portion 64 extending downward from the inner wall 56 toward the electrode 26. An alternative to this geometry would be to place the two fiber metal bodies of different materials end to end. The electrode passes through the two bodies consecutively and both the contact and gettering functions are accomplished.

A further embodiment is illustrated in FIG. 3, wherein the components corresponding to those already described in connection with FIGS. 1 and 2 have like reference characters. This embodiment, like that shown in FIG. 2, utilizes at least two separate or discrete fiber metal bodies to perform the electrical contact function and the inert gas gettering function. The first fiber metal body 66 forms the contact tube which is in physical and electrical contact with the electrode 26, and which is connected by suitable terminal means 24 to the source of welding current 20. The welding torch housing, illustrated as 80, is insulated from the contact tube 66 by insulation 81. The other terminal of the source is connected in a conventional manner to a workpiece 68, shown for example as a pair of plates 70 and 72 which are welded together at seam 74. Gas supplying means 76 is provided for conducting the inert gas to the welding puddle, and is illustrated in this embodiment as being formed by an inlet tube 78 which enters the lower portion of the welding torch housing 80 at an oblique angle to the longitudinal axis of the welding electrode 26. The tube 78 defines the passage for the inert shielding gas. The shielding gas passes through a second fiber metal body 82, of the type previously described, but having in this embodiment a closed or solid geometry, which may be of circular cross-section or other shape in conformance with the inside diameter of the tube 78 to assure that all of the gas passes therethrough. A nozzle 84 is provided in the vicinity of the welding area, the nozzle being so designed to produce the desired flow over the weld puddle, the particular nozzle configuration and the nature of the gas flow pattern forming no part of the present invention.

It is of course understood that the welding apparatus as described herein and illustrated in the figures are merely exemplary of constructions in accordance with the invention, and the teachings of the present invention may be applied to welding apparatus and torches of various well-known types considerably different in appearance than those herein illustrated. Further, although the specific embodiments herein described employ a consumable electrode, the present invention is of course applicable to welding apparatus employing non-consumable tungsten electrodes.

Various modifications of the present invention, including variations in geometry, details of construction, etc., will be apparent to those skilled in the art, and accordingly, the scope of the present invention should be defined only by the claims, and equivalents thereof.

Various of the features of the invention are set forth in the following claims:

What is claimed is:

1. An arc welding apparatus comprising a welding electrode, terminal means adapted to be electrically connected to a source of power, a fiber metallurgical contact member disposed in electrical and mechanical contact with said terminal means and said welding electrode, said fiber metallurgical contact member comprising a felted mass of discrete, randomly oriented, interlocking metal fibers compressed into a self-supporting state, and means for moving the welding electrode relative to said fiber metallurgical contact member while maintaining contact therebetween.

2. The apparatus of claim 1 wherein said felted mass of metal fibers is sintered.

3. The apparatus of claim 1 further comprising means for conducting an inert gas to the area of the weld to provide a shielding shroud thereabout, said means including fiber metallurgical getter means for extracting contaminants from the inert gas passed therethrough, and said getter means including a fiber metallurgical body comprising a felted mass of discrete, randomly oriented, interlocking metal fibers compressed into a self-supporting state.

4. The apparatus of claim 3 wherein said fiber metallurgical body of the getting means is disposed sufficiently close to the welding area so that the radiant heat therefrom enhances the gettering action.

5. The apparatus of claim 3 wherein said gettering means and said contact member comprise a single fiber metallurgical body common to both.

6. The apparatus of claim 5 wherein said single fiber metallurgical body is in the form of a tube having annular opposed faces and a longitudinal aperture extending therethrough, said welding electrode being disposed within said aperture in electrical and physical contact with the tube, and said gas conducting means comprises means for passing the shielding gas flow into one of said annular faces and out of the other.

7. The apparatus of claim 3 wherein said contact member and said gettering means each comprise a separate fiber metallurgical body, the fiber metallurgical body of said contact member comprising a metal from the group consisting of copper, molybdenum and stainless steel, and the fiber metallurgical body of said gettering means comprising a metal from the group consisting of titanium, zirconium and tantalum.

8. An arc welding apparatus comprising a welding electrode, terminal means adapted to be electrically connected to a source of power, a contact member disposed in electrical and mechanical contact with said terminal means and said welding electrode, and means for conducting an inert shielding gas to the area of the weld including a fiber metallurgical body and means for passing the gas flow through said body, whereby contaminants in the inert shielding gas are extracted by the action of said fiber metallurgical body, said body comprising a felted mass of discrete, randomly oriented, interlocking metal fibers compressed into a self-supporting state.

9. The apparatus of claim 8 wherein said contact is in the form of a tube concentric with said welding electrode, and said fiber metallurgical body is coaxial to said tube and electrode.

10. The apparatus of claim 8 wherein said body comprises a metal from the group consisting of titanium, zirconium, and tantalum.

11. A contact for use in welding apparatus comprising an elongated fiber metallurgical body having a longitudinal hollow therein for receiving a relatively movable welding electrode, said hollow being of such size as to make physical and electrical contact with said electrode, and said fiber metallurgical body comprising a felted mass of discrete, randomly oriented, interlocking metal fibers compressed into a self-supporting state, the walls of said hollow thereby conforming to the welding electrode passing therethrough.

12. The contact of claim 11 wherein said felted mass of metal fibers is sintered.

13. In an arc welding apparatus comprising a welding electrode, terminal means adapted to be electrically connected to a source of power, a contact member disposed in electrical contact with said terminal means and said welding electrode and means for conducting a gas to the area of the weld, including a gettering means for extracting contaminants from the gas passing therethrough, said contact member and said gettering means comprising a common fiber metallurgical body in the form of a felted mass of discrete, randomly oriented, interlocking metal fibers compressed into a self-supporting state.

14. The apparatus of claim 13 further comprising means for moving the welding electrode relative to said fiber metallurgical body while maintaining contact therebetween.

15. The apparatus of claim 13 wherein said felted mass of metal fibers is sintered.

16. The apparatus of claim 13 wherein said body comprises a metal from the group consisting of copper, molybdenum, stainless steel, titanium, zirconium and tantalum.

17. The apparatus of claim 13 wherein said gas conducting means comprises means for conducting an inert gas through said gettering means to the area of the weld to provide a shielding shroud thereabout.

18. The apparatus of claim 13 wherein said fiber metallurgical body is in the form of a cylinder having annular opposed faces and a longitudinal aperture extending therethrough, said longitudinal aperture adapted to receive said welding electrode in an interference fit therewithin, and said gas conducting means comprising means for passing the shielding gas flow into one of said annular faces and out of the other.

19. The apparatus of claim 13 wherein said fiber metallurgical body is disposed sufficiently close to the welding area so that the radiant heat therefrom enhances the gettering action.

20. The apparatus of claim 13 wherein said fiber metallurgical body comprises two different metals.

21. The apparatus of claim 20 wherein one metal is selected from the group consisting of copper, molybdenum and stainless steel, and the other metal is selected from the group consisting of titanium, zirconium and tantalum.

References Cited
UNITED STATES PATENTS

| | | | |
|---|---|---|---|
| 2,834,870 | 5/1958 | Platte | 219—75 |
| 2,974,216 | 3/1961 | Inoue | 219—69 |
| 3,184,578 | 5/1965 | Albers et al. | 219—76 |
| 2,918,563 | 12/1959 | Ternisien et al. | 219—74 |
| 2,957,101 | 10/1960 | Barley | 219—130 |
| 2,977,457 | 3/1961 | Houldcroft et al. | 219—74 |
| 3,053,968 | 9/1962 | Gorman et al. | 219—74 |
| 3,102,948 | 9/1963 | McCampbell et al. | 219—130 |
| 3,127,668 | 4/1964 | Troy | 29—182 |
| 3,325,626 | 6/1967 | Sargent | 219—74 |

JOSEPH V. TRUHE, Primary Examiner

C. L. ALBRITTON, Assistant Examiner

U.S. Cl. X.R.

219—130